Burnham W. King Jr. INVENTOR.

Figure 1:
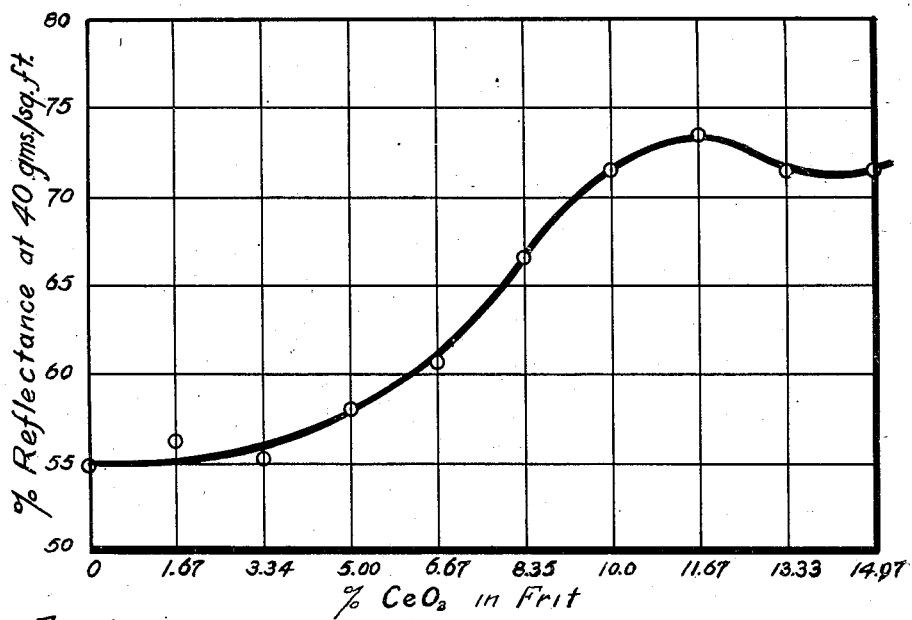

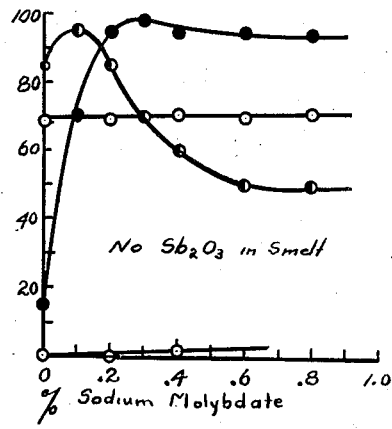
Fig. 3 — No Sb₂O₃ in Smelt
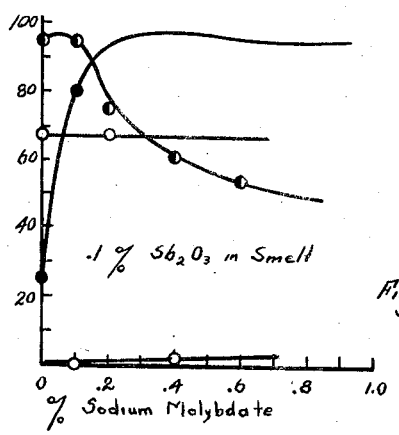
Fig. 4 — .1% Sb₂O₃ in Smelt
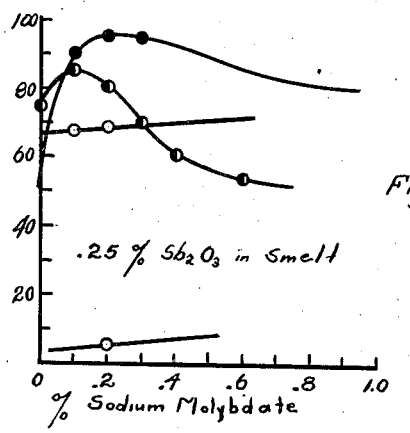
Fig. 5 — .25% Sb₂O₃ in Smelt
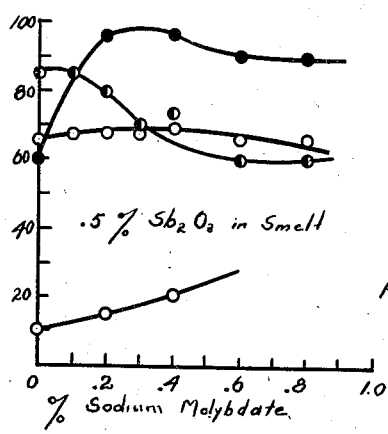
Fig. 6 — .5% Sb₂O₃ in Smelt
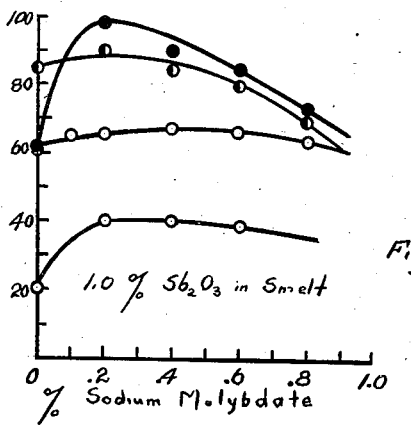
Fig. 7 — 1.0% Sb₂O₃ in Smelt
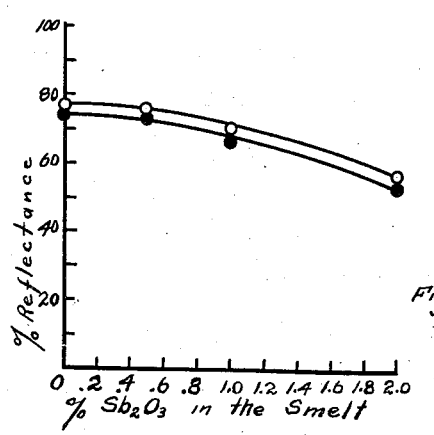
Fig. 8

Patented Mar. 19, 1946

2,396,856

UNITED STATES PATENT OFFICE 2,396,856

ENAMEL COMPOSITION

Burnham W. King, Jr., Shaker Heights, Ohio, assignor to The Harshaw Chemical Company, Elyria, Ohio, a corporation of Ohio Application July 13, 1944, Serial No. 544,765

23 Claims. (Cl. 106—48)

This invention relates to vitreous enamels and has particular reference to that class of vitreous enamels known as light ground coats and one coat white enamels.

In commercial enameling practice, it is customary to apply on sheet steel a ground coat containing an oxide of cobalt, nickel or manganese, usually all three, after suitable pre-treatment of the steel, including cleaning, and sometimes other special preparation such as a nickel dip or nickel flash. Usually the ground coat is of a dark color resulting from the use of cobalt oxide or other color imparting oxide, and in order to produce a white or light colored enamel, it is necessary to apply one or two additional cover coats over these dark colored ground coats. For a long time it has been recognized that a satisfactory light colored and firmly adherent ground coat would be desirable, and workers in the art have long sought for a white or light colored enamel which would be suitable for use as a one coat application. The literature records a number of attempts to produce enamels of such quality, but so far as I am aware, they have not been completely successful.

I have now discovered a class of vitreous enamel compositions which adhere well to sheet steel, cast iron, copper, etc., which have satisfactory whiteness or reflectance, and which exhibit satisfactory surface appearance. The class of vitreous enamels referred to, in the optimum proportion ranges of components, can be used as one coat enamels or as light ground coats, according to choice. In proportion ranges somewhat outside the optimum, these compositions may be useful as light ground coats but not satisfactory as one coat enamels by reason of insufficient whiteness or unsatisfactory surface characteristics, such as low gloss or other minor surface defects capable of being covered by the second coat. Again, departing further from the optimum ranges, there may yet be produced enamels of excellent adherence which have quite low reflectance and may be useful only for non-decorative purpose or for purposes where whiteness is of little importance.

Accordingly, it may be stated that the principal object of the invention is to provide enamels of satisfactory opacity, surface quality and adherence, and relying upon components other than color imparting oxides to impart satisfactory adherence. Numerous other objects will be in part obvious from the following description and in part pointed out therein.

Figure 2:
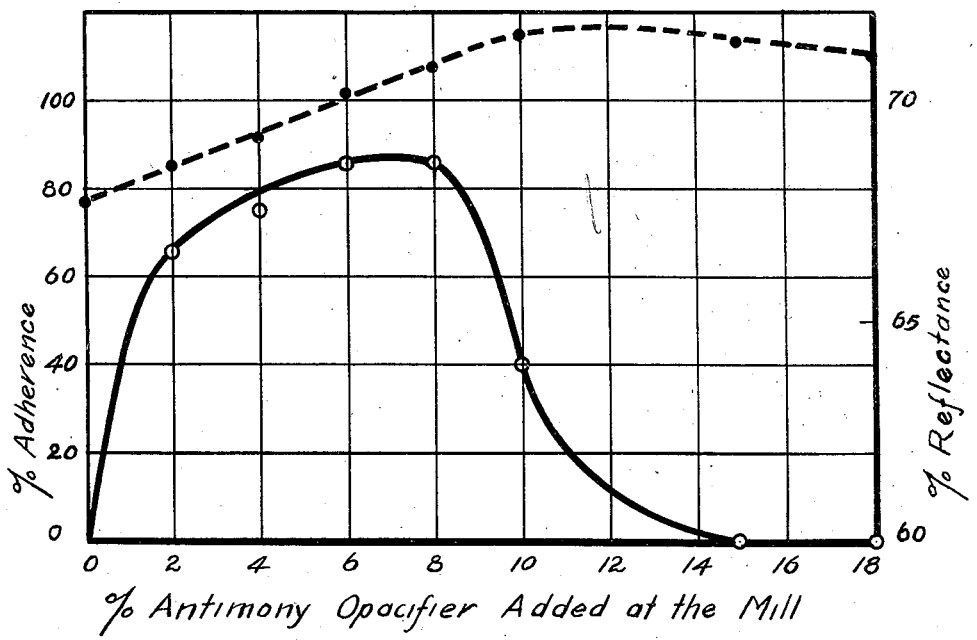

In the accompanying drawings, Fig. 1 is a diagram illustrating the relationship between reflectance obtained in the enamel and the percentage of cerium oxide contained in the frit from which the enamel was made; Fig. 2 is a diagram illustrating the effect on adherence and also the effect on reflectance of the proportion of antimony opacifier added at the mill; Figs. 3 to 7, inclusive, are diagrams showing the effect of sodium molybdate in the frit composition on the adherence, reflectance and surface characteristics of the finished enamel, Fig. 3 being based upon compositions containing no antimony in the frit and Figs. 4 to 7, inclusive, being based upon compositions containing increasing amounts of antimony in the frit up to 1%; and Fig. 8 is a diagram showing the effect of increasing the antimony content of the frit on the reflectance of the resulting enamel.

Vitreous enamels are glassy materials which contain numerous components but which for the purpose of the present description may be regarded as consisting of basic glass components and special additions for the accomplishment of the purposes of the invention. In the production of the frit, I use basic glass components such as are commonly used in the vitreous enameling art, and examples of which are hereinafter set forth in detail, and I include herewith in the smelter batch a relatively large quantity of one or more cerium compounds, preferably ceric hydrate or ceric oxide, and a relatively minor amount of either a molybdenum compound or an antimony compound, or both. After the frit is produced, I include with it in the mill batch a composition containing antimony. The use of cerium in the frit plus antimony at the mill is essential to the realization of the benefits of my invention in any substantial degree. (Wherever antimony compounds are specified herein, it is possible to obtain the benefits of the invention to a substantial degree by substituting corresponding arsenic compounds, although it is my view that the poisonous character of arsenic will limit its use very greatly.) The use of cerium and a small amount of antimony in the frit plus antimony at the mill gives improved results over the use of cerium in the frit and antimony at the mill. The use of cerium and molybdenum in the frit plus antimony at the mill gives even better results, and the fullest benefit of the invention is realized only when cerium, molybdenum and antimony are used in the frit plus antimony at the mill. The use of cerium in the above indicated compositions appears to be related in considerable degree to adherence and more largely to ultimate whiteness and surface quality of the enamel. The use of antimony or molybdenum or both in small quantities in the frit produces important effects on adherence. The use of antimony is indispensable from the standpoint of satisfactory adherence of the resulting enamels to steel and, if the antimony is used at the mill in the form of an opacifier, excellent adherence and whiteness of the enamels are obtained.

Proportions are of great importance to the results achieved, as will be obvious from the drawings, tables and examples. Attention is called to the fact, however, that the drawings and tables are based upon specific studies, and some variations from the results therein indicated would be expected if other conditions were varied and, accordingly, these are to be considered as examples only and not as absolute limits. For example, by unusually fine grinding the amount of antimony mill addition can be increased.

Fig. 1 represents a series of tests based upon a satisfactory composition (see Table I, sample Number 1, for basic glass used in studies illustrated in the drawings) and varying only the quantity of cerium compound in the frit. It will be seen that the opacity of the resulting enamel varied from 55% total reflectance in the absence of any cerium compound to a value between 73 and 74% total reflectance at 11.67% $CeO_2$. The reflectance then dropped off slightly. In Fig. 2, I have represented the results of a study of the effects on adherence and reflectance of varying the quantity of antimony opacifier added at the mill. As indicated, per cent antimony added at the mill is represented along the horizontal base line. Ordinates along the left side of the figure indicate adherence with reference to the full line curve, while ordinates along the right side of the figure indicate per cent reflectance with reference to the broken line curve. Antimony was added in the form of a calcination product of antimony, calcium and titanium oxides, and calcium fluoride which is a commercial opacifying agent sold under the trade name "Uverite," and having approximately the formula, $3\frac{1}{2}CaO.Sb_2O_5.3TiO_2.\frac{1}{2}CaF_2$. The word "Uverite" is used herein for convenience to indicate this specific composition. It is a registered trade-mark and has been applied to other opacifying compositions, but for the purpose of this specification, it is to be understood as indicating approximately this specific composition. It is desirable to use antimony at the mill in a form which has opacifying value in order to obtain maximum reflectance. It will be noted that good adherence was obtained in the range of 2 to 10%, and that maximum reflectance was obtained at about 12%. The frit was ground to 95% through 200 mesh. By grinding to 95% through 325 mesh, good adherence could be obtained as high as 15% Uverite.

In Figs. 3 to 8, inclusive, I have shown the results of studies on the effect of proportions of additives in the frit. These are indicated in Figs. 3 to 7, inclusive, by the three uppermost curves in the figures and show properties of enamels resulting therefrom in which Uverite was added at the mill to the extent of 4% by weight. The lowermost curve in each of Figs. 3 to 7, inclusive, indicates the reflectance in each case where no antimony was added at the mill. Adherence is not shown in these in the absence of antimony added at the mill, but it was unsatisfactory in each case, being slightly better in the case of the compositions of Figs. 6 and 7 than in the case of the compositions of Figs. 3, 4 and 5. This is, of course, due to the presence of antimony which was contained in the frit in the compositions of Figs. 6 and 7. As this would indicate, other studies have shown that antimony added in the frit does promote adherence but has a deleterious effect on reflectance, as indicated in Fig. 8. In Figs. 3 to 7, inclusive, the points which were determined are indicated by circles, adherence values being indicated by completely filled circles, surface quality being indicated by half-filled circles, and reflectance values being indicated by open circles. Adherence, reflectance and surface quality are indicated in these views by ordinates 0–100 in each case.

All reflectance values indicated in the drawings and specifications are based on percentage of a standard which is magnesium oxide. Measurements of reflectance values indicated herein were made on a Hunter reflectometer and indicate total diffuse reflectance. All determinations have been made on samples of the enamel described applied direct on sheet metal of enameling quality. In all cases the enamel was applied on the metal to a thickness of 40 grams per square foot as nearly as possible.

Measurements of adherence were made substantially in accordance with the laboratory test for adherence appearing on pages 45 and 46 of "Inspectors' Manual for Porcelain Enameled Items" of the office of the Quartermaster General of the War Department, issued on January 1, 1943. The apparatus used was similar to that shown on page 43 of said inspectors' manual, and the construction of which is somewhat better illustrated in Figure 32 on page 44 thereof. The apparatus employed consisted essentially of a weight of 2.2 pounds having a spherical striking projection one inch in diameter which was allowed to drop from a height of 25 inches and to strike the sample which was clamped on an anvil having an opening immediately beneath the point where the weight strikes. The opening in the anvil was slightly more than one inch in diameter. The weight deforms the sample sheet making a depression therein of a depth of about $\frac{1}{8}$ of an inch. This device is commonly used in testing adherence of enamels, and while the result involves an element of estimation, persons familiar with its use are able to obtain saisfactory determinations of fair accuracy. When the weight strikes the sample, the enamel flakes off, but if the adherence is good there remains on the surface from which the enamel has flaked off a thin layer of adherent glass appearing to be in the form of splinters or crystals visible to the naked eye and which give the surface a characteristic satin finish. If the adherence is very poor, the enamel flakes off leaving a perfectly smooth metal surface. Between these extremes the observer can detect a gradual transition which can be estimated with reasonable accuracy. On the basis of these estimations, I have rated the adherence on a scale of 0 to 100.

Determination of surface quality is a matter of estimation which involves a substantial personal equation, but it is possible to determine relative superiority with a fair degree of accuracy. The one coat white enamels indicated in the drawings have been rated as to surface excellence on a rough approximation basis, taking samples appearing to be of good commercial quality as having a value from 95 to 100, samples having what I regard as a fair or passable commercial quality as 85 to 90, and samples of poor commercial quality as 80, and using 70 as the value which I consider the absolute lower limit of salability. Still lower values I consider unsalable. Values for surface quality are thus to be considered only as approximations, but I believe they do have sufficient accuracy to be useful considering the gross differences involved in the samples described herein. Regard was had to gloss, bubbles, pin holes and other surface defects, some of which are indicated more specifically in connection with the description of the samples.

Not only the composition of the basic glass but also the smelting, quenching, milling and firing practice should follow good enameling technique. It will not be necessary to describe such technique completely since it is well understood by persons skilled in the art. It will be desirable, however, to indicate preferred and optimum composition ranges not only as to additives but also as to the basic glass, and to give specific examples of successful compositions according to the invention and to outline illustrative procedures involved in the practice of the invention.

In respect to the composition of the enamel frit, the preferred range and a range which I consider optimum are as follows, reference being had to theoretical melted composition of the frit expressed in per cent by weight:

|  | Preferred range | Optimum range |
| --- | --- | --- |
|  | Per cent | Per cent |
| $Na_2O+K_2O+Li_2O$ | 14 to 25 | 16 to 21 |
| $K_2O$ | 0 to 10 | 0 to 5 |
| $Li_2O$ | 0 to 5 | 0 to 2 |
| $B_2O_3$ | 5 to 15 | 7 to 13 |
| $Al_2O_3$ | 0 to 15 | 0 to 11 |
| $SiO_2$ | 35 to 55 | 38 to 51 |
| $F_2$ * | 3 to 15 | 5 to 12 |
| $CaO$ | 0 to 10 | 0 to 8 |
| $P_2O_5$ | 0 to 2 | 0 to 1 |
| $ZnO$ | 0 to 5 | 0 to 2 |
| $MgO$ | 0 to 4 | 0 to 2 |
| $BaO$ | 0 to 8 | 0 to 4 |
| $CeO_2$ | 2 to 18 | 7 to 12 |
| $Sb_2O_3$ | 0 to 1.0 | 0.1 to 0.6 |
| $MoO_3$ | 0 to 0.5 | 0.05 to 0.2 |

* Fluorine content of fluorine compounds in the smelter batch are calculated to fluorine although it is not certain in what state of combination the fluorine exists in the frit.

The proportions stated foregoing take into account the most common ingredients of vitreous enamels, but it is obvious that other components less commonly used could be included in greater or less degree without losing the advantages of the invention, or might be tolerated to a greater or less extent.

Compositions according to the invention, preferably within the limits above indicated, are smelted and made into a frit in accordance with usual good practice. The frit is milled with other ingredients, such as clay, an electrolyte, and water, and with an antimony containing mill addition whereby to form an enamel slip which is then applied direct on steel and fired. In referring to mill additions, reference is had principally to the standard commercial practice of wet milling the frit with clay and other usual ingredients of the mill batch according to the enameler's choice. It is to be understood, however, that dry milling, separately grinding the frit, and additions to be made thereto followed by mixing with or without grinding and like procedures are included. The essential point is that a mill addition is added to the frit after smelting and is not smelted together with the frit ingredients.

The antimony mill addition may be any of numerous antimony compounds relatively insoluble in water. For example, I may use an antimony oxide, such as $Sb_2O_3$, a sodium-antimony-oxygen compound, such as sodium meta antimonate ($NaSbO_3$), or sodium meta antimonite ($NaSbO_2$), or sodium pyro antimonate ($Na_2H_2Sb_2O_7$). Again, I may use calcium-antimony-oxygen compounds, such as calcium antimonate ($CaSb_2O_6$). I may also use calcination products of calcium, antimony and titanium, or calcium, antimony and zirconium, preferably such as are claimed in U. S. Patents 2,306,356 and 2,306,357. The preferred compositions, briefly stated, cover a range for each molecular weight of $Sb_2O_5$ of from 1 to 4½ molecular weights of $TiO_2$ or $ZrO_2$ or a mixture thereof, from 2.75 to 4.5 molecular weights of $CaO$, and from ¼ to 1 molecular weight of $CaF_2$. Other basic ingredients such as barium, magnesium or zinc may be substituted for calcium in these compositions. I prefer to employ a composition approximating the following formula: $3½CaO.Sb_2O_5.3TiO_2.½CaF_2$, since its use results in satisfactory adherence and gives excellent opacity or whiteness as compared to some other antimony compounds. For example, it is distinctly superior to antimony oxide in respect to whiteness. (I have also used

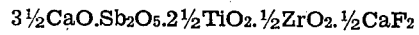

$$3½CaO.Sb_2O_5.2½TiO_2.½ZrO_2.½CaF_2$$

with equally good results.) I may also use as mill additions for supplying the requisite antimony any of various commercial so-called opaque antimony frits. These are very excellent from the adherence standpoint although distinctly inferior to the calcium-antimony-titanium calcination products from the standpoint of whiteness of the resulting enamel. Various other water insoluble or relatively water insoluble antimony oxygen compounds or compositions may be employed. Likewise, mixtures of the above named antimony oxygen compositions can be used successfully. (It is to be understood that the mill batch may contain, in addition to antimony or arsenic oxy-compounds or compositions containing them, water, enameling clay, electrolytes, color oxides and indifferent materials.)

The proportions of the antimony mill additions may be varied through a wide range. I prefer to add to the frit at the mill such proportions of antimony mill addition as will have a calculated $Sb_2O_3$ content between ½ and 7 parts, preferably 1½ to 4 parts, by weight for each 100 parts of frit. I do not know whether all the above mill additions are true antimony oxy-compounds, but it is obvious that they either are antimony oxy-compounds or contain such compounds. The latter appears likely and the antimony oxide seems to be the active portion for my purposes since the calculated $Sb_2O_3$ content is a fair measure of the quantity of these diverse compositions needed in the practice of the invention.

As above indicated, it is possible to substitute arsenic oxy-compounds for antimony oxy-compounds although the antimony compounds are preferred because of the extremely poisonous character of arsenic. Using the smelter batch composition of sample Number 3, Table I, frits were prepared using ½%, 1% and 2% of $As_2O_3$ as smelter addition, percentage being based on theoretical melted composition of the resulting frit. At ½% As₂O₃, the adherence was 5%, the reflectance was 68.2 and the surface quality was fair. At 1% As₂O₃, the adherence was 40%, the reflectance 65.9% and the surface quality poor (70–80 on the basis of rated surface quality set forth above). At 2% As₂O₃, adherence was 90, the reflectance 67.3 and the surface quality again poor. These enamels were made up from the frits indicated and made into a slip using 4% "Uverite" at the mill. From this, it will be obvious that arsenic can be substituted for antimony in the frit composition and that adherence can be improved thereby.

In order to determine the effect of using arsenic as a substitute for antimony oxy-compounds at the mill, frit similar to that of sample Number 5, Table I, was milled with 4% of tricalcium arsenate and resulted in an enamel having an adherence of 85–90, a reflectance of 65–70 and a surface quality of poor commercial grade. The frit employed differed from that of sample Number 5, Table I, in that the smelter batch contained two parts of dicalcium phosphate which, I believe, had very little influence on the result. Tricalcium arsenate was selected for this test because of its very low water solubility and because, of the arsenic compounds available, it appeared most similar to calcium antimonate and "Uverite" which were very effective antimony composition.

I prefer to add the above indicated mill additions in accordance with usual enameling practice. In other words, the frit is prepared and ground with the mill addition to form a slip which is then applied direct on steel and fired. I am aware, however, that variations in this procedure can be made. It is possible, for example, to add the mill addition to the smelter batch near the end of the smelting operation so that very little reaction takes place. This is obviously the equivalent of a mill addition to the extent that reaction does not take place in the smelter batch. Such procedures are obviously within the scope of the invention. Again, it is possible to form portions of frits containing the required smelter additions and mix such frits at the mill. For example, I may prepare one frit in accordance with sample Number 5, Table I, and another in accordance with sample Number 6, Table I, and mix the two at the mill together with the mill addition indicated and thereby produce an enamel in accordance with the invention. Various procedures of this nature can be followed and are obvious equivalents of the preferred practice described.

One advantage of the invention is that the firing temperature can be reduced as compared with normal current practice in firing ground coats. For example, it is customary to fire ground coat enamels of composition similar to those described herein at from 1520 to 1560° F. Cover coats for enamels of this type are currently fired at from 1480 to 1520° F. I find that I am able to obtain good adherence in general from the preferred compositions described herein by firing at a temperature of about 1475° F., which is substantially lower than current ground coat practice for similar enamels. It is to be understood, of course, that for best results the firing temperature must be adjusted to the optimum for each composition and furnace condition. It is not possible in the case of all compositions within the scope of the invention to fire as low as 1475° F. In some cases, the adherence is lower when fired at that temperature than when fired at the usual ground coat firing temperature of 1520 to 1560° F. The enamels described herein should be fired in the range of 1475° F. to 1560° F., and wherever possible the lower temperatures should be used to avoid deformation of the metal and to save the expense incident to higher firing.

As is well known to persons skilled in the art, the nature of the association of the components of enamel frits and enamels is uncertain. There may be reaction of the various oxides, fluorides, etc. to form complex compounds, or these components may be present in solid solution, or otherwise physically combined. Accordingly, when the compositions of enamels and frits are described in terms of component oxides or as containing certain oxides, fluorides, fluorine, or the like, it is to be understood as meaning that these components or the elements of which they are made up can be found on analysis. These compositions are often spoken of as being capable of yielding on analysis certain component oxides, fluorides, etc., and this again means merely that such components or the elements thereof are contained in the composition in a state of association or combination with other elements which is not known with certainty. For example, when it is stated herein that the Sb₂O₃ or Sb₂O₅ content is a specified percentage, it is not intended to indicate that the antimony is present as that oxide but only that the proportion is calculated as if the antimony were in that form.

In Table I, I have shown the results of a study undertaken for the purpose of comparing the results of using antimony, molybdenum and cerium in the smelter batch. For each sample number there is shown in this table the smelter batch, the theoretical melted composition of the frit, and the reflectance, adherence and surface quality of the resulting enamel without mill addition and with the use of 4% Uverite at the mill. It will be noted that best results were had when all three were used as in sample Number 7, that good results were had with cerium in combination with either antimony or molybdenum, and that a passable result was secured by the use of cerium without either antimony or molybdenum.

Table II indicates the results of a study of various mill additions, using one of the good frit compositions as a base. It will be noted that antimony trioxide gave the poorest results of the mill additions tried, and this is rather to be expected since it has never been found to compare with other antimony compositions as a mill addition opacifier. It will be noted, however, that sample Number 2, using antimony trioxide at the mill, functions very effectively in elevating the adherence. With no mill addition, adherence was 0, while with four parts of antimony trioxide, it was 60. Sample Number 3, using sodium antimonate, shows much improved reflectance and an adherence value of 50. It is not to be concluded from this that sodium antimonate is poorer than antimony trioxide in respect to adherence, since in each case the amount employed was 4% by weight and the Sb₂O₃ content of the sodium antimonate was less than the weight of Sb₂O₃ used in the case of sample Number 2. Calcium antimonate gave excellent results, but Uverite seemed to be the most effective composition from the standpoint of reflectance, adherence and surface quality taken together. In the case of sample Numbers 6 and 7, use was made of an opaque antimony frit as a mill addition, or perhaps it might be said that two frits were ground together in equal proportions, and the result was the production of very excellent adherence with accompanying loss of reflectance. While these results indicate compositions of the type of sample Numbers 6 and 7 to be inferior to, for example, sample Number 5, it is quite feasible to take advantage of the very excellent adherence exhibited by these compositions by using them as ground coats and following with cover coats giving higher reflectance values. I may, for example, use the composition of sample Number 6 as a ground coat and follow with the composition of sample Number 5 as a cover coat.

In Table III, I have shown a series of fourteen samples showing variations in composition of the various constituents of the frit. Some of these gave much more valuable results than others, but all of them are valuable and realize the benefits of the invention in substantial degree. The reflectance, adherence and surface qualities were determined by application direct on steel at 40 grams per square foot after milling with 4 parts by weight of Uverite for each 100 parts of frit.

In making the studies described herein, the various conditions were controlled as closely as possible so as to show the actual effect of the variables being studied. The factors are numerous and difficult to control, and I have not maintained throughout the same close control of all variables that were maintained in respect to the determinations of each study. Results described herein are reproducible to a reasonable degree, but in reproducing any particular experiment, I would expect some variation.

While the frits disclosed herein have been developed primarily with respect to their use as a ground coat or one coat enamel, I am aware that they are also useful as cover coats, and it is a feature of my invention to use them as such, not only over the ground coats herein disclosed but also over other ground coats. When these compositions are used as ground coats, they may be followed by various cover coats in commercial use and known to persons skilled in the art.

Table I

| Sample number | 1 | 2 | 3 | 4 | 5 | 6 | 7 |
|---|---|---|---|---|---|---|---|

SMELTER BATCH (PARTS BY WEIGHT)

| | | | | | | | |
|---|---|---|---|---|---|---|---|
| Feldspar | 20 | 20 | 20 | 20 | 20 | 20 | 20 |
| Borax (dehydrated) | 13 | 13 | 13 | 13 | 13 | 13 | 13 |
| Quartz | 25.3 | 25.3 | 25.3 | 25.3 | 25.3 | 25.3 | 25.3 |
| Soda ash | 4.0 | 4.0 | 4.0 | 4.0 | 4.0 | 4.0 | 4.0 |
| Sodium nitrate | 9.7 | 9.7 | 9.7 | 9.7 | 9.7 | 9.7 | 9.7 |
| Cryolite | 9.0 | 9.0 | 9.0 | 9.0 | 9.0 | 9.0 | 9.0 |
| Sodium silico fluoride | 5.9 | 5.9 | 5.9 | 5.9 | 5.9 | 5.9 | 5.9 |
| Antimony trioxide | 0.1 | 0 | 0 | 0.1 | 0 | 0.1 | 0.1 |
| Sodium molybdate | 0 | 0.1 | 0 | 0.1 | 0.1 | 0 | 0.1 |
| Ceric hydrate | 0 | 0 | 12 | 0 | 12 | 12 | 12 |

THEORETICAL MELTED COMPOSITION (PARTS BY WEIGHT)

| | | | | | | | |
|---|---|---|---|---|---|---|---|
| $Na_2O$ | 11.23 | 11.27 | 9.95 | 11.24 | 9.96 | 9.93 | 9.97 |
| $K_2O$ | 2.72 | 2.72 | 2.43 | 2.74 | 2.43 | 2.43 | 2.43 |
| CaO | 0.05 | 0.05 | 0.05 | 0.05 | 0.05 | 0.05 | 0.05 |
| $B_2O_3$ | 11.64 | 11.64 | 10.31 | 11.61 | 10.30 | 10.30 | 10.29 |
| $Al_2O_3$ | 4.53 | 4.53 | 4.02 | 4.52 | 4.01 | 4.01 | 4.01 |
| $SiO_2$ | 50.43 | 50.44 | 44.71 | 50.40 | 44.69 | 44.68 | 44.60 |
| $CeO_2$ | | | 11.46 | | 11.44 | 11.44 | 11.43 |
| $MoO_3$ | | 0.08 | | 0.08 | 0.07 | | 0.07 |
| $Sb_2O_3$ | 0.13 | | | 0.13 | | 0.11 | 0.11 |
| $Na_3AlF_6$ * | 11.64 | 11.64 | 10.31 | 11.61 | 10.30 | 10.30 | 10.29 |
| $Na_2SiF_6$ * | 7.63 | 7.63 | 6.76 | 7.62 | 6.75 | 6.75 | 6.75 |

| Sample number | 1 | 2 | 3 | 4 | 5 | 6 | 7 |
|---|---|---|---|---|---|---|---|

PER CENT REFLECTANCE (MgO=100%) AT 40 GMS./SQ. FT. DIRECT ON STEEL

| | | | | | | | |
|---|---|---|---|---|---|---|---|
| No mill addition | 36.3 | 20.3 | 61.6 | 24.0 | 61.1 | 64.9 | 59.3 |
| Mill addition 4% Uverite | 42.0 | 38.0 | 68.5 | 45.3 | 70.0 | 66.4 | 70.4 |

PER CENT ADHERENCE AT 40 GMS./SQ. FT. DIRECT ON STEEL

| | | | | | | | |
|---|---|---|---|---|---|---|---|
| No mill addition | 0 | 0 | 0 | 0 | 0 | 0 | 0 |
| Mill addition 4% Uverite | 5 | 70 | 30 | 40 | 80 | 30 | 85 |

SURFACE QUALITY AT 40 GMS./SQ. FT. DIRECT ON STEEL

| | | | | | | | |
|---|---|---|---|---|---|---|---|
| No mill addition | Poor | Poor | Fair | Poor | Fair | Good | Good |
| Mill addition 4% Uverite | Poor | Poor | Good | Poor | Good | Good | Good |

* These compounds probably break down, but I am not certain what the end products are.

Table II

| Sample number | 1 | 2 | 3 | 4 | 5 | 6 | 7 |
|---|---|---|---|---|---|---|---|

THEORETICAL MELTED COMPOSITION OF FRIT (PARTS BY WEIGHT)

| | | | | | | | |
|---|---|---|---|---|---|---|---|
| $Na_2O$ | 9.8 | 9.8 | 9.8 | 9.8 | 9.8 | 9.8 | 9.8 |
| $K_2O$ | 2.38 | 2.38 | 2.38 | 2.38 | 2.38 | 2.38 | 2.38 |
| CaO | .8 | .8 | .8 | .8 | .8 | .8 | .8 |
| $B_2O_3$ | 10.12 | 10.12 | 10.12 | 10.12 | 10.12 | 10.12 | 10.12 |
| $Al_2O_3$ | 3.94 | 3.94 | 3.94 | 3.94 | 3.94 | 3.94 | 3.94 |
| $SiO_2$ | 43.82 | 43.82 | 43.82 | 43.82 | 43.82 | 43.82 | 43.82 |
| $CeO_2$ | 11.24 | 11.24 | 11.24 | 11.24 | 11.24 | 11.24 | 11.24 |
| $MoO_3$ | .07 | .07 | .07 | .07 | .07 | .07 | .07 |
| $Sb_2O_3$ | .11 | .11 | .11 | .11 | .11 | .11 | .11 |
| $P_2O_5$ | .9 | .9 | .9 | .9 | .9 | .9 | .9 |
| $Na_3AlF_6$ * | 10.12 | 10.12 | 10.12 | 10.12 | 10.12 | 10.12 | 10.12 |
| $Na_2SiF_6$ * | 6.64 | 6.64 | 6.64 | 6.64 | 6.64 | 6.64 | 6.64 |

MILL BATCH COMPOSITION (PARTS BY WEIGHT)

| | | | | | | | |
|---|---|---|---|---|---|---|---|
| Above frit | 100 | 100 | 100 | 100 | 100 | 50 | 50 |
| Sb-Frit ** | 0 | 0 | 0 | 0 | 0 | 50 | 0 |
| Sb-Frit ** | 0 | 0 | 0 | 0 | 0 | 0 | 50 |
| $Sb_2O_3$ | 0 | 4 | 0 | 0 | 0 | 0 | 0 |
| $NaSbO_3$ | 0 | 0 | 4 | 0 | 0 | 0 | 0 |
| $CaSb_2O_6$ | 0 | 0 | 0 | 4 | 0 | 0 | 0 |
| Uverite | 0 | 0 | 0 | 0 | 4 | 4 | 0 |
| Clay | 6 | 6 | 6 | 6 | 6 | 6 | 6 |
| $NaNO_3$ | .125 | .125 | .125 | .125 | .125 | .125 | .125 |
| $MgCO_3$ | .1 | .1 | .1 | .1 | .1 | .1 | .1 |
| Water | 40 | 40 | 40 | 40 | 40 | 40 | 40 |

PER CENT REFLECTANCE (MgO=100%) AT 40 GMS./SQ. FT. DIRECT ON STEEL

| | | | | | | | |
|---|---|---|---|---|---|---|---|
| Reflectance | 65.5 | 58.1 | 67.9 | 67.0 | 70.0 | 57.3 | 52.0 |

PER CENT ADHERENCE AT 40 GMS./SQ. FT. DIRECT ON STEEL

| | | | | | | | |
|---|---|---|---|---|---|---|---|
| Adherence | 0 | 60 | 50 | 45 | 70 | 98 | 90 |

SURFACE QUALITY AT 40 GMS./SQ. FT. DIRECT ON STEEL

| | | | | | | | |
|---|---|---|---|---|---|---|---|
| Surface | Good | Poor | Good | Good | Good | Fair | Fair |

* These compounds probably break down, but I am not certain what the end products are.
** A commercial "super opaque" antimony frit containing about 12% $Sb_2O_5$. Various frits ranging from 5% to 15% antimony pentoxide are suitable, e. g., $SiO_2$ 40.9%, $Al_2O_3$ 6.4%, $B_2O_3$ 9.7%, CaO 2.2%, ZnO 3.4%, $K_2O$ 2.3%, $Na_2O$ 17.5%, $F_2$ 5.3%, $Sb_2O_5$ 12.4%. For other examples, see Jour. of Res., National Bur. of Stds. 20, 39-55 (1938).

Table III

| Sample number | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| THEORETICAL MELTED COMPOSITION OF FRIT (PARTS BY WEIGHT) | | | | | | | | | | | | | | |
| $Na_2O$ | 17.43 | 19.51 | 17.66 | 18.12 | 18.55 | 20.42 | 16.50 | 16.47 | 19.33 | 16.80 | 17.01 | 19.30 | 17.01 | 14.03 |
| $K_2O$ | 2.14 | ----- | 2.28 | 2.34 | 2.41 | ----- | 2.16 | ----- | 2.21 | 2.18 | 2.20 | ----- | 2.20 | 3.94 |
| $B_2O_3$ | 11.18 | 7.12 | 9.70 | 9.93 | 10.21 | 7.48 | 9.15 | 9.23 | 11.50 | 12.71 | 9.36 | 10.73 | 9.36 | 11.24 |
| $Al_2O_3$ | 5.74 | ----- | 6.11 | 10.61 | 6.44 | ----- | 5.77 | 8.31 | 6.67 | 5.82 | 5.91 | ----- | 5.91 | 6.49 |
| $SiO_2$ | 38.25 | 51.27 | 45.93 | 41.76 | 39.58 | 49.17 | 41.50 | 40.93 | 39.35 | 41.90 | 42.54 | 51.60 | 42.54 | 38.95 |
| F * | 11.90 | 9.36 | 9.11 | 9.45 | 9.60 | 9.83 | 10.49 | 10.59 | 10.50 | 8.68 | 8.81 | 4.29 | 8.81 | 5.24 |
| CaO | 4.96 | 0.74 | 0.04 | 0.04 | 0.81 | 3.47 | 2.82 | 2.80 | 0.04 | 0.73 | 0.74 | 3.22 | 0.74 | 7.79 |
| $CeO_2$ | 8.40 | 10.99 | 10.77 | 7.07 | 11.34 | 9.63 | 8.45 | 10.26 | 10.40 | 10.25 | 10.40 | 10.73 | 10.40 | 11.95 |
| $P_2O_5$ | ----- | 0.94 | ----- | ----- | 0.96 | ----- | ----- | ----- | ----- | 0.87 | 0.89 | ----- | 0.89 | ----- |
| $Li_2O$ | ----- | ----- | ----- | ----- | ----- | ----- | ----- | 1.41 | ----- | ----- | ----- | ----- | ----- | ----- |
| ZnO | ----- | ----- | ----- | ----- | ----- | ----- | ----- | ----- | ----- | ----- | ----- | 2.08 | ----- | ----- |
| MgO | ----- | ----- | ----- | ----- | ----- | ----- | 3.16 | ----- | ----- | ----- | ----- | ----- | 2.08 | ----- |
| BaO | ----- | ----- | ----- | ----- | ----- | ----- | ----- | ----- | ----- | ----- | ----- | ----- | ----- | 0.30 |
| $Sb_2O_3$ | ----- | ----- | 0.27 | 0.55 | ----- | ----- | ----- | ----- | ----- | ----- | ----- | ----- | ----- | ----- |
| $MoO_3$ | ----- | 0.07 | 0.13 | 0.13 | 0.07 | ----- | ----- | ----- | ----- | 0.06 | 0.06 | 0.13 | 0.06 | 0.07 |
| PER CENT REFLECTANCE (MgO=100%) AT 40 GMS./SQ. FT. DIRECT ON STEEL | | | | | | | | | | | | | | |
| Reflectance | 56.7 | 55.0 | 68.5 | 61.5 | 70.0 | 44.0 | 53.0 | 60.0 | 65.0 | 64.7 | 70.0 | 55.0 | 69.6 | 56.5 |
| PER CENT ADHERENCE AT 40 GMS./SQ. FT. DIRECT ON STEEL | | | | | | | | | | | | | | |
| Adherence | 80 | 70 | 95 | 80 | 70 | 70 | 80 | 60 | 50 | 75 | 70 | 90 | 50 | 50 |
| SURFACE QUALITY AT 40 GMS./SQ. FT. DIRECT ON STEEL | | | | | | | | | | | | | | |
| Surface | Good | Good | Good | Good | Good | Good | Good | Good | Poor | Good | Good | Fair | Good | Good |

\* Fluorine content of fluorine compounds in the smelter batch are calculated to fluorine although it is not certain in what state of combination the fluorine exists in the frit. The amount of oxygen indicated is excessive since all fluorides were calculated to oxides on the basis of determinations of the other elements.

The following specific examples will serve to illustrate the invention:

Example I

A frit was made up by smelting 20 parts feldspar, 13 parts dehydrated borax, 25 parts quartz, 9.7 parts sodium nitrate, 4.0 parts sodium carbonate, 3.8 parts fluorspar, 9 parts cryolite, 5.9 parts sodium silicofluoride and 10 parts ceric hydrate. The resulting frit was formed into an enamel slip by milling 1000 parts of the frit with 400 parts of water, 60 parts of enameling clay and 40 parts of an antimony opacifier of the formula $3\frac{1}{2}CaO.Sb_2O_5.3TiO_2.\frac{1}{2}CaF_2$. The resulting slip was applied direct on steel, 40 grams per square foot, and fired. The adherence was found to be dependent upon the time and temperature of firing. Firing at 775° C. for 8 minutes resulted in adherence of 15%, and if fired for 10 minutes, the adherence increased to 40%. Firing at 800° C., the adherence at 6 minutes firing time was 30%, and at 8 minutes was 75%. Firing at 825° C., the adherence at 4 minutes firing time was 75%, at 6 minutes was 50% and at 8 minutes was 30%. Firing at 850° C., the adherence was 50% at 2, 4 and 6 minutes. However, the surface became rough after 2 minutes at 850° C.

It will be noted that in this example no molybdenum was used and there was no antimony in the smelter batch. While it is preferable to include antimony or molybdenum or both in the smelter batch, it will be seen from this example that results of substantial value can be obtained using cerium in the smelter batch and antimony oxide or material containing antimony oxide at the mill. The opacity obtained in this instance was approximately 60% which would be unsatisfactory for uses requiring high opacity, but for uses where low opacity can be tolerated it would be quite satisfactory, the adherence under optimum firing conditions being well above the minimum for commercial quality.

Example II

A frit was made up by smelting 20 parts of feldspar, 13 parts dehydrated borax, 25.3 parts of quartz, 4 parts of soda ash, 9.7 parts of sodium nitrate, 9 parts of cryolite, 5.9 parts of sodium silicofluoride, 12 parts of ceric hydrate, 0.1 part sodium molybdate and 0.1 part of antimony trioxide. The resulting frit was formed into an enamel slip by milling 1000 parts of the frit with 400 parts of water, 60 parts of clay and 40 parts of an antimony opacifier of the formula $3\frac{1}{2}CaO.Sb_2O_5.3TiO_2.\frac{1}{2}CaF_2$. The resulting slip was applied direct on steel, 40 grams per square foot, and fired at 1520° F. for about 5 minutes. The enamel so produced had a reflectance of 70.4, an adherence of 85 and surface characteristics of good commercial quality.

Example III

The procedure of Example II was repeated except that instead of using the antimony opacifier of that example, a like quantity of a composition of the formula $$3\frac{1}{2}CaO.Sb_2O_5.2\frac{1}{2}TiO_2.\frac{1}{2}ZrO_2.\frac{1}{2}CaF_2$$

was employed. Results were approximately the same.

Example IV

A frit of theoretical melted composition, 9.8 parts $Na_2O$, 2.38 parts $K_2O$, 0.8 part CaO, 10.12 parts $B_2O_3$, 3.94 parts $Al_2O_3$, 43.82 parts $SiO_2$, 11.24 parts $CeO_2$, 0.07 part $MoO_3$, 0.11 part $Sb_2O_3$, 0.9 part $P_2O_5$, 10.12 parts $Na_3AlF_6$ and 6.64 parts $Na_2SiF_6$ was milled with $Sb_2O_3$ in the proportion of 4 parts $Sb_2O_3$, 40 parts of water and 6 parts of clay for each 100 parts of frit. The resulting slip was applied direct on steel, 40 grams per square foot, and fired at 1520° F. for about 5 minutes. The enamel so produced had a reflectance of 58.1%, an adherence of 60% and a surface quality of poor commercial grade.

Example V

Following otherwise Example IV, 4 parts of $NaSbO_3$ were substituted for the antimony oxide mill addition. The reflectance was 67.9%, the adherence 50% and the surface of good commercial quality.

*Example VI*

Following otherwise Example IV, 4 parts of $CaSb_2O_6$ were substituted for the antimony oxide mill addition. The reflectance was 67%, the adherence 45% and the surface of good commercial quality.

*Example VII*

Fifty parts of a frit of theoretical melted composition as in Example IV were milled with 50 parts of a commercial opaque antimony frit containing 12% $Sb_2O_3$, 40 parts of water and 6 parts of clay. The resulting slip was applied direct on steel at 40 grams per square foot and fired at 1520° F. for about 5 minutes. The enamel so produced had a reflectance of 57.3%, an adherence of 98% and a surface of fair commercial quality.

*Example VIII*

Using an enameled body produced according to Sample Number 6 of Table II, a cover coat was applied which was produced according to Sample Number 3 of Table III, procedure being otherwise according to Example II. The reflectance was increased to 78% and the surface was of good commercial quality. Using the slip of Example I as a cover coat gives approximately the same result. The slips of any of Examples I, II, III, V and VI may be used as cover coats over any of the ground coats of Examples I to VII, inclusive, or other ground coats such as usual commercial cobalt ground coats with good results.

What I claim is:

1. An enamel composition comprising a frit and an oxy-compound of an element of the class consisting of antimony and arsenic, said frit containing alkali metal oxide, silica and cerium oxide, the cerium oxide constituting from 7% to 18% of the frit by weight, and said oxy-compound being present in the composition as a mill addition in proportion to yield on analysis for each 100 parts by weight of frit ½ to 7 parts by weight of the trioxide of said element.

2. An enamel composition comprising a frit and an oxy-compound of an element of the class consisting of antimony and arsenic, said frit containing alkali metal oxide, silica and cerium oxide, the cerium oxide constituting from 7% to 18% of the frit by weight, and said oxy-compound being present in the composition as a mill addition in proportion to yield on analysis for each 100 parts by weight of frit 1½ to 4 parts by weight of the trioxide of said element.

3. An enamel composition comprising a frit and an oxy-compound of antimony which is difficultly soluble in water, said frit containing from 14 to 25 per cent alkali metal oxides, 5 to 15 per cent $B_2O_3$, 35 to 55 per cent $SiO_2$, 3 to 15 per cent fluorine, 7 to 18 per cent cerium oxide, 0 to 1.0 per cent $Sb_2O_3$ and 0 to 0.5 per cent $MoO_3$, weight basis, said oxy-compound of antimony being present in the composition as a mill addition in proportion to yield on analysis for each 100 parts by weight of frit ½ to 7 parts by weight of $Sb_2O_3$.

4. An enamel composition comprising a frit and an oxy-compound of antimony which is difficultly soluble in water, said frit containing from 14 to 25 per cent alkali metal oxides, 5 to 15 per cent $B_2O_3$, 35 to 55 per cent $SiO_2$, 3 to 15 per cent fluorine, 7 to 18 per cent cerium oxide, 0 to 1.0 per cent $Sb_2O_3$ and 0 to 0.5 per cent $MoO_3$, weight basis, said oxy-compound of antimony being present in the composition as a mill addition in proportion to yield on analysis for each 100 parts by weight of frit 1½ to 4 parts by weight of $Sb_2O_3$.

5. An enamel composition comprising a frit and a calcination product, said calcination product containing the oxides of calcium, antimony and an element of the group consisting of titanium and zirconium and mixtures thereof in proportions for each molecular weight of $Sb_2O_5$ from 1 to 4½ molecular weights of oxide of the class consisting of $TiO_2$ and $ZrO_2$ and mixtures thereof, from 2.75 to 4.5 molecular weights of CaO and from ¼ to 1 molecular weight of $CaF_2$, said frit containing from 14 to 25 per cent alkali metal oxides, 5 to 15 per cent $B_2O_3$, 35 to 55 per cent $SiO_2$, 3 to 15 per cent fluorine, 7 to 18 per cent cerium oxide, 0 to 1.0 per cent $Sb_2O_3$ and 0 to 0.5 per cent $MoO_3$, weight basis, said calcination product being present in the composition as a mill addition in proportion to yield on analysis for each 100 parts by weight of frit ½ to 7 parts by weight of $Sb_2O_3$.

6. An enamel composition comprising a frit and a calcination product, said calcination product containing the oxides of calcium, antimony and an element of the group consisting of titanium and zirconium and mixtures thereof, in proportions for each molecular weight of $Sb_2O_5$ from 1 to 4½ molecular weights of oxide of the class consisting of $TiO_2$ and $ZrO_2$ and mixtures thereof, from 2.75 to 4.5 molecular weights of CaO and from ¼ to 1 molecular weight of $CaF_2$, said frit containing from 14 to 25 per cent alkali metal oxides, 5 to 15 per cent $B_2O_3$, 35 to 55 per cent $SiO_2$, 3 to 15 per cent fluorine, 7 to 18 per cent cerium oxide, 0 to 1.0 per cent $Sb_2O_3$ and 0 to 0.5 per cent $MoO_3$, weight basis, said calcination product being present in the composition as a mill addition in proportion to yield on analysis for each 100 parts by weight of frit 1½ to 4 parts by weight of $Sb_2O_3$.

7. An enamel composition comprising a frit and a calcium antimonate, said frit containing from 14 to 25 per cent alkali metal oxides, 5 to 15 per cent $B_2O_3$, 35 to 55 per cent $SiO_2$, 3 to 15 per cent fluorine, 7 to 18 per cent cerium oxide, 0 to 1.0 per cent $Sb_2O_3$ and 0 to 0.5 per cent $MoO_3$, weight basis, and said calcium antimonate being present in the composition as a mill addition in proportion to yield on analysis for each 100 parts by weight of frit ½ to 7 parts by weight of $Sb_2O_3$.

8. An enamel composition comprising a frit and a calcium antimonate, said frit containing from 14 to 25 per cent alkali metal oxides, 5 to 15 per cent $B_2O_3$, 35 to 55 per cent $SiO_2$, 3 to 15 per cent fluorine, 7 to 18 per cent cerium oxide, 0 to 1.0 per cent $Sb_2O_3$ and 0 to 0.5 per cent $MoO_3$, weight basis, and said calcium antimonate being present in the composition as a mill addition in proportion to yield on analysis for each 100 parts by weight of frit 1½ to 4 parts by weight of $Sb_2O_3$.

9. An enamel composition comprising a frit and a sodium antimonate, said frit containing from 14 to 25 per cent alkali metal oxides, 5 to 15 per cent $B_2O_3$, 35 to 55 per cent $SiO_2$, 3 to 15 per cent fluorine, 7 to 18 per cent cerium oxide, 0 to 1.0 per cent $Sb_2O_3$ and 0 to 0.5 per cent $MoO_3$, weight basis, and said sodium antimonate being present in the composition as a mill addition in proportion to yield on analysis for each 100 parts by weight of frit ½ to 7 parts by weight of $Sb_2O_3$.

10. An enamel composition comprising a frit and a sodium antimonate, said frit containing from 14 to 25 per cent alkali metal oxides, 5 to 15 per cent $B_2O_3$, 35 to 55 per cent $SiO_2$, 3 to 15 per cent fluorine, 7 to 18 per cent cerium oxide, 0 to 1.0 per cent $Sb_2O_3$ and 0 to 0.5 per cent $MoO_3$, weight basis, and said sodium antimonate being present in the composition as a mill addition in proportion to yield on analysis for each 100 parts by weight of frit 1½ to 4 parts by weight of $Sb_2O_3$.

11. A process of producing a vitreous enameled steel body which comprises smelting a batch containing alkali, silica and a cerium oxy-compound, said cerium oxy-compound being employed to an extent to yield cerium at least 7% (calculated at $CeO_2$) of the frit by weight, intimately admixing the resulting frit with a difficultly water soluble oxy-compound of an element of the class consisting of antimony and arsenic in proportion to yield on analysis, for each 100 parts by weight of the frit, from ½ to 7 parts by weight of the trioxide of such element, applying the resulting mixture on a steel body and firing.

12. A process of producing a vitreous enameled steel body which comprises smelting a batch containing alkali, silica, a cerium oxy-compound in proportion to yield on analysis from 2 to 18 per cent $CeO_2$, a molybdenum oxy-compound in proportion to yield on analysis from 0.05 to 0.5 per cent $MoO_3$ and an antimony oxy-compound in proportion to yield on analysis from 0 to 1.0% $Sb_2O_3$, percentages based on the weight of the resulting frit, milling the resulting frit with a difficultly water soluble oxy-compound of antimony in proportion to yield on analysis, for each 100 parts by weight of the frit, from ½ to 7 parts by weight of the trioxide of antimony, applying the resulting slip direct on steel and firing.

13. A process of producing a vitreous enameled steel body which comprises smelting a batch containing alkali, silica, a cerium oxy-compound in proportion to yield on analysis from 7 to 12% $CeO_2$, an antimony oxy-compound in proportion to yield on analysis from 0.1 to 0.6% $Sb_2O_3$, a molybdenum oxy-compound in proportion to yield on analysis from 0.05 to 0.2% $MoO_3$, percentages being based on the weight of the resulting frit, milling the resulting frit with a difficultly water soluble oxy-compound of an element of the class consisting of antimony and arsenic in proportion to yield on analysis, for each 100 parts by weight of the frit, from 1½ to 4 parts by weight of the trioxide of such element, applying the resulting slip direct on steel and firing.

14. A vitreous enamel frit composition containing 14 to 25 per cent of alkali metal oxide, 5 to 15 per cent $B_2O_3$, 35 to 55 per cent $SiO_2$, 7 to 18 per cent cerium oxide, 0 to 1.0 per cent $Sb_2O_3$ and 0.05 to 0.5 per cent $MoO_3$, percentages by weight.

15. A vitreous enamel frit composition containing 14 to 25 per cent of alkali metal oxide, 5 to 15 per cent $B_2O_3$, 35 to 55 per cent $SiO_2$, and 7 to 12 per cent $CeO_2$, percentages by weight.

16. A vitreous enamel frit composition containing 14 to 25 per cent of alkali metal oxide, 5 to 15 per cent $B_2O_3$, 35 to 55 per cent $SiO_2$, 7 to 12 per cent cerium oxide and 0.1 to 0.6 per cent $Sb_2O_3$, percentages by weight.

17. A vitreous enamel frit composition containing 14 to 25 per cent of alkali metal oxide, 5 to 15 per cent $B_2O_3$, 35 to 55 per cent $SiO_2$, 7 to 18 per cent cerium oxide and 0.05 to 0.2 per cent $MoO_3$, percentages by weight.

18. A vitreous enamel frit composition containing 14 to 25 per cent of alkali metal oxide, 5 to 15 per cent $B_2O_3$, 35 to 55 per cent $SiO_2$, 7 to 18 per cent cerium oxide, 0.1 to 0.6 per cent $Sb_2O_3$, and 0.05 to 0.2 per cent $MoO_3$, percentages by weight.

19. A vitreous enameled body comprising a steel base, a vitreous ground coat adherent thereto, and a vitreous cover coat adherent to said ground coat, said cover coat comprised of a frit containing from 7 to 18% cerium oxide and an opacifier comprising an oxy-compound of an element of the class consisting of antimony and arsenic in proportion from 0.5 to 10 per cent of the frit by weight.

20. A vitreous enameled body comprising a steel base, a vitreous ground coat adherent thereto and a vitreous cover coat adherent to said ground coat, said ground coat comprising (1) a frit containing 14 to 25 per cent of alkali metal oxide, 5 to 15 per cent $B_2O_3$, 35 to 55 per cent $SiO_2$, 7 to 18 per cent cerium oxide, 0.1 to 1.0 per cent $Sb_2O_3$, and 0.05 to 0.5 per cent $MoO_3$ and (2) an antimony oxy-compound in proportion to yield on analysis for each 100 parts by weight of frit from ½ to 7 parts by weight of $Sb_2O_3$ and said cover coat comprising (1) a frit containing 2 to 18% $CeO_2$ and (2) an opacifier in proportion from 1 to 10 per cent of the frit by weight.

21. A process of producing a vitreous enameled steel body which comprises smelting a batch containing alkali, silica, a cerium oxy-compound in proportion to yield on analysis from 7 to 12% of a cerium oxide, an antimony oxy-compound in proportion to yield on analysis from 0.1 to 0.6% $Sb_2O_3$, a molybdenum oxy-compound in proportion to yield on analysis from 0.05 to 0.2% $MoO_3$, percentages being based on the weight of the resulting frit, milling the resulting frit with a calcination product of calcium, antimony and titanium oxides containing on the analytical basis for each molecular weight of $Sb_2O_5$ from 1 to 4½ molecular weights of $TiO_2$, from 2.75 to 4.5 molecular weights of CaO and from ¼ to 1 molecular weight of $CaF_2$, said calcination product being employed in proportion to yield on analysis, for each 100 parts by weight of the frit, from 1½ to 4 parts by weight of the trioxide of antimony, applying the resulting slip direct on steel and firing.

22. A process of producing a vitreous enameled steel body which comprises smelting a batch containing alkali, silica, a cerium oxy-compound in proportion to yield on analysis from 7 to 12% of a cerium oxide, an antimony oxy-compound in proportion to yield on analysis from 0.1 to 0.6% $Sb_2O_3$, a molybdenum oxy-compound in proportion to yield on analysis from 0.05 to 0.2% $MoO_3$, percentages being based on the weight of the resulting frit, milling the resulting frit with a calcium antimonate 100 parts by weight of the frit, from 1½ to 4 parts by weight of the trioxide of antimony, applying the resulting slip direct on steel and firing.

23. A process of producing a vitreous enameled steel body which comprises smelting a batch containing alkali, silica, a cerium oxy-compound in proportion to yield on analysis from 7 to 12% a cerium oxide, an antimony oxy-compound in proportion to yield on analysis from 0.1 to 0.6% $Sb_2O_3$, a molybdenum oxy-compound in proportion to yield on analysis from 0.05 to 0.2% $MoO_3$, percentages being based on the weight of the resulting frit, milling the resulting frit with sodium antimonate 100 parts by weight of the frit, from 1½ to 4 parts by weight of the trioxide of antimony, applying the resulting slip direct on steel and firing.

BURNHAM W. KING, Jr.